US012752620B2

(12) United States Patent
Bewermeyer et al.

(10) Patent No.: US 12,752,620 B2
(45) Date of Patent: Oct. 6, 2026

(54) LIQUID TANK FOR A LIQUID SYSTEM OF A VEHICLE, LIQUID SYSTEM, AND VEHICLE

(71) Applicant: HELLA GmbH & Co. KGaA, Lippstadt (DE)

(72) Inventors: Frank Bewermeyer, Paderborn (DE); Finn Malte Fischer, Aachen (DE); Benjamin Grothe, Wickede (DE); Dominik Niess, Selm (DE)

(73) Assignee: HELLA GmbH & Co. KGaA, Lippstadt (DE)

( * ) Notice: Subject to any disclaimer, the term of this patent is extended or adjusted under 35 U.S.C. 154(b) by 212 days.

(21) Appl. No.: 18/227,658

(22) Filed: Jul. 28, 2023

(65) Prior Publication Data

US 2023/0364982 A1 Nov. 16, 2023

Related U.S. Application Data

(63) Continuation of application No. PCT/EP2022/051130, filed on Jan. 19, 2022.

(30) Foreign Application Priority Data

Jan. 29, 2021 (DE) ..................... 10 2021 102 022.0

(51) Int. Cl.
*B60K 11/02* (2006.01)
*B60K 1/00* (2006.01)
(Continued)

(52) U.S. Cl.
CPC ........ *B60K 11/02* (2013.01); *B60K 15/03177* (2013.01); *B60T 11/26* (2013.01);
(Continued)

(58) Field of Classification Search
CPC .. B60K 11/02; B60K 15/03177; B60K 15/03; B60K 2001/005; B60K 2015/03032;
(Continued)

(56) References Cited

U.S. PATENT DOCUMENTS 4,514,980 A 5/1985 Ishiwata
4,739,730 A 4/1988 Jenz et al.
(Continued)

FOREIGN PATENT DOCUMENTS

CN 105835690 A * 8/2016
DE 3533095 A1 3/1987
(Continued)

OTHER PUBLICATIONS

International Search Report dated May 6, 2022 in corresponding application PCT/EP2022/051130.

*Primary Examiner* — Angelisa L. Hicks
(74) *Attorney, Agent, or Firm* — Muncy, Geissler, Olds & Lowe, P.C.

(57) ABSTRACT

A liquid tank for a liquid system of a vehicle, comprising a tank housing for storage of a liquid of the liquid system, wherein the tank housing is designed as multiple shells and has at least two tank housing shells that are joined to one another, and at least one flow passage of the liquid system, which flow passage is integrated in the tank housing. At least one of the at least one flow passages integrated in the tank housing is formed by two joined tank housing shells of the at least two tank housing shells.

12 Claims, 4 Drawing Sheets

(51) Int. Cl.

| | |
|---|---|
| ***B60K 15/03*** | (2006.01) |
| ***B60T 11/26*** | (2006.01) |
| ***F01P 7/14*** | (2006.01) |
| ***F01P 11/02*** | (2006.01) |

(52) U.S. Cl.

CPC ....... *F01P 11/029* (2013.01); *B60K 2001/005* (2013.01); *B60K 15/03* (2013.01); *B60K 2015/03032* (2013.01); *B60K 2015/03256* (2013.01); *B60K 2015/0346* (2013.01); *B60Y 2410/122* (2013.01); *F01P 2007/146* (2013.01); *F01P 2050/24* (2013.01)

(58) Field of Classification Search

CPC .. B60K 2015/03256; B60K 2015/0346; B60T 11/26; F01P 11/029; F01P 2007/146; F01P 2050/24; B60Y 2410/122

See application file for complete search history.

(56) References Cited

U.S. PATENT DOCUMENTS

| | | | | |
|---|---|---|---|---|
| 6,491,180 | B2 | 12/2002 | Distelhoff et al. | |
| 6,661,339 | B2 * | 12/2003 | Muirhead | G08B 13/2434 340/505 |
| 10,011,168 | B2 | 7/2018 | Luehn et al. | |
| 10,598,078 | B2 | 3/2020 | Myers | |
| 11,111,839 | B2 | 9/2021 | Ayva et al. | |
| 2010/0206882 | A1 * | 8/2010 | Wessels | F01P 11/029 220/562 |
| 2019/0170053 | A1 * | 6/2019 | Mark | F01P 11/029 |
| 2020/0262291 | A1 | 8/2020 | Collatuzzo et al. | |
| 2022/0126682 | A1 * | 4/2022 | Kerschbaumer | B60K 15/03177 |

FOREIGN PATENT DOCUMENTS

| | | | |
|---|---|---|---|
| DE | 4312063 | C1 | 6/1994 |
| DE | 102013004926 | A1 | 9/2014 |
| DE | 102017006079 | A1 | 1/2019 |
| DE | 102018202236 | A1 | 8/2019 |
| DE | 102019112192 | A1 | 12/2019 |
| DE | 102019104333 | A1 | 8/2020 |
| DE | 102020134977 | A1 | 7/2021 |
| EP | 1002682 | A2 | 5/2000 |
| FR | 2874879 | A1 | 3/2006 |
| GB | 1584728 | A | 2/1981 |
| KR | 1020170135253 | | 12/2017 |

* cited by examiner

LIQUID TANK FOR A LIQUID SYSTEM OF A VEHICLE, LIQUID SYSTEM, AND VEHICLE

This nonprovisional application is a continuation of International Application No. PCT/EP2022/051130, which was filed on Jan. 19, 2022, and which claims priority to German Patent Application No. 10 2021 102 022.0, which was filed in Germany on Jan. 29, 2021, and which are both herein incorporated by reference.

BACKGROUND OF THE INVENTION

Field of the Invention

The present invention relates to a liquid tank for a liquid system of a vehicle, a liquid system of a vehicle, and a vehicle.

Description of the Background Art

Liquid tanks for liquid systems of vehicles, liquid systems for vehicles, and vehicles are already known from the prior art in numerous embodiments. The known liquid tanks for liquid systems of vehicles in this case comprise a tank housing for storage of a liquid of the liquid system, wherein the tank housing is designed as multiple shells and has at least two tank housing shells that are joined to one another, and at least one flow passage of the liquid system, which flow passage is integrated in the tank housing.

SUMMARY OF THE INVENTION

The object of the present invention is to improve a liquid tank for a liquid system of a vehicle, a liquid system of a vehicle, and a vehicle.

This object is attained by a liquid tank for a liquid system of a vehicle, which is characterized in that at least one of the at least one flow passages integrated in the tank housing is formed by two joined tank housing shells of the at least two tank housing shells. The at least one of the at least one flow passages integrated in the tank housing that is formed by two joined tank housing shells of the at least two tank housing shells can be formed, for example, as a flow passage connecting the liquid tank in a flow-conducting manner to a remainder of the liquid system. This is not absolutely imperative, however. Accordingly, in this regard it can also be a flow passage of the liquid system that is not directly connected to the liquid tank in a flow-conducting manner. In addition, this object is attained by a liquid system of a vehicle, and a vehicle.

An important advantage of the invention is, in particular, that a liquid tank for a liquid system of a vehicle, a liquid system of a vehicle, and a vehicle are improved.

On account of the design according to the invention of the liquid tank for a liquid system of a vehicle, of the liquid system of a vehicle, and of the vehicle, it is possible to implement the aforementioned liquid tank, the aforementioned liquid system for a vehicle, and the aforementioned vehicle in a manner that is especially simple in terms of design and manufacturing. Furthermore, a centralization of the components of a liquid system for a vehicle is made possible as a result. At the same time, a flow-optimized shape of the flow passages of the liquid system can be implemented easily in terms of manufacturing in this case, since the at least one flow passage of the liquid system formed by two joined tank housing shells is not only integrated in the tank housing, but can be freely configured within broad suitable limits on account of the aforementioned design.

An especially advantageous improvement of the liquid tank according to the invention for a liquid system of a vehicle provides that a first valve is arranged in at least one of the at least one integrated flow passages, preferably in the flow passage formed by the two joined tank housing shells. As a result, the arrangement of the aforementioned valve can be implemented in a manner that is especially simple in terms of design and manufacturing. This is because, for example, the aforementioned valve need not be designed as a component that is to be separately connected to a flow passage in a flow-conducting manner. In the case of flow passages that normally are designed as hose lines, it is necessary for the valve to be connected thereto to have, on the one hand, a housing that is suitable for the purpose and on the other hand to have two fittings that can be connected to this hose line in a flow-conducting manner. This is not necessary with the present improvement of the liquid tank according to the invention. The first valve can be designed to be correspondingly reduced. The aforementioned advantages of this improvement apply, in particular, to the preferred embodiment of this improvement.

In principle, the first valve can be freely chosen within broad suitable limits in terms of type, mode of operation, material, dimensioning, and relative arrangement in the corresponding flow passage. The first valve is advantageously designed as a check valve. In this way, the check valves that are required in liquid systems, in particular, can be arranged in the liquid system, namely in the relevant corresponding flow passage, in a manner that is simple in terms of design and manufacturing.

Another advantageous improvement of the liquid tank according to the invention for a liquid system of a vehicle provides that the tank housing can be simultaneously designed as a valve housing for at least one second valve of the liquid system. In this way, the number of components of the liquid system is reduced, on the one hand. The logistics, the inventory management, and the manufacturing of the liquid system for a vehicle are simplified accordingly. On the other hand, a very compact, and therefore space-saving, construction of the liquid system is made possible by this means. Preferably, the second valve can be designed as a so-called multiway valve in order to thus reduce the number of second valves required in the liquid system. As an alternative or in addition to the aforementioned multiway valve, a multiplicity of second valves whose respective valve housings are each formed in the tank housing is also possible, however.

An especially advantageous improvement of the aforementioned embodiment of the liquid tank according to the invention for a liquid system of a vehicle provides that one of the tank housing shells of the tank housing is simultaneously designed as the valve housing for the second valve, preferably that the valve housing is designed as a bottommost tank housing shell of the tank housing, especially preferably that the tank housing has at least three tank housing shells with the bottommost tank housing shell, a middle tank housing shell, and a topmost tank housing shell. In this way, the tank housing of the liquid tank with the valve housing of the second valve integrated therein can be implemented in a manner that is especially simple in terms of design and manufacturing. This applies especially to the preferred embodiment, and in particular to the especially preferred embodiment, of this improvement. The last-mentioned design of the tank housing as three shells, with a topmost tank housing shell, a middle tank housing shell, and a bottommost tank housing shell, is not absolutely imperative, however.

A further advantageous improvement of the liquid tank according to the invention for a liquid system of a vehicle provides that the tank housing shells are each designed as an injection molded plastic part. Injection molded plastic parts can be freely configured in diverse ways within technical limits, so even very complicated design configurations of liquid tanks according to the invention can be realized by plastic injection molding. The design of the liquid tank composed of individual tank housing shells of the tank housing additionally increases design options without making manufacture of the liquid tank according to the invention more difficult as a result.

In principle, the liquid system according to the invention for a vehicle can be freely chosen within broad suitable limits in terms of type, mode of operation, and arrangement in the vehicle. For example, it is possible that the liquid system for the vehicle is designed as a coolant system for cooling vehicle components of the vehicle. Strictly by way of example, only electric vehicles and so-called hybrid vehicles are mentioned here. Such vehicles have a traction battery, an electric drive motor along with the corresponding power electronics, as well as, e.g., a refrigerant circuit for air conditioning a passenger compartment of the vehicle. The traction battery, the electric drive motor with the corresponding power electronics, and the refrigerant circuit of the vehicle are designed, for example, in a manner known per se to the person skilled in the art and can be cooled and/or heated by means of the liquid system according to the invention designed as a coolant system.

Analogously to one of the aforementioned improvements of the liquid tank according to the invention, an advantageous improvement of the liquid system according to the invention for a vehicle provides that the liquid system has at least one second valve for controlling at least one liquid flow of the liquid in the liquid system, which valve is connected in a flow-conducting manner to the liquid circuit and/or to the liquid tank, wherein the tank housing is simultaneously designed as a valve housing for the second valve of the liquid system. As already explained with respect to the corresponding improvement of the liquid tank, the number of components of the liquid system is reduced as a result, on the one hand. The logistics, the inventory management, and the manufacturing of the liquid system for a vehicle are simplified accordingly. On the other hand, a very compact, and therefore space-saving, construction of the liquid system is made possible by this means. Preferably, the second valve can be designed as a so-called multiway valve in order to thus reduce the number of second valves required in the liquid system.

An advantageous improvement of the aforementioned embodiment of the liquid system according to the invention for a vehicle provides that one of the tank housing shells of the tank housing is simultaneously designed as the valve housing for the second valve, preferably that the valve housing is designed as a bottommost tank housing shell of the tank housing, especially preferably that the tank housing has at least three tank housing shells with the bottommost tank housing shell, a middle tank housing shell, and a topmost tank housing shell. As a result, as already discussed above, the tank housing of the liquid tank with the valve housing integrated therein can be achieved in a manner that is simple in terms of design and manufacturing. This applies especially to the preferred embodiment, and in particular to the especially preferred embodiment, of this improvement.

However, the design of the tank housing of the liquid tank as three shells is not imperative, as likewise already discussed.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
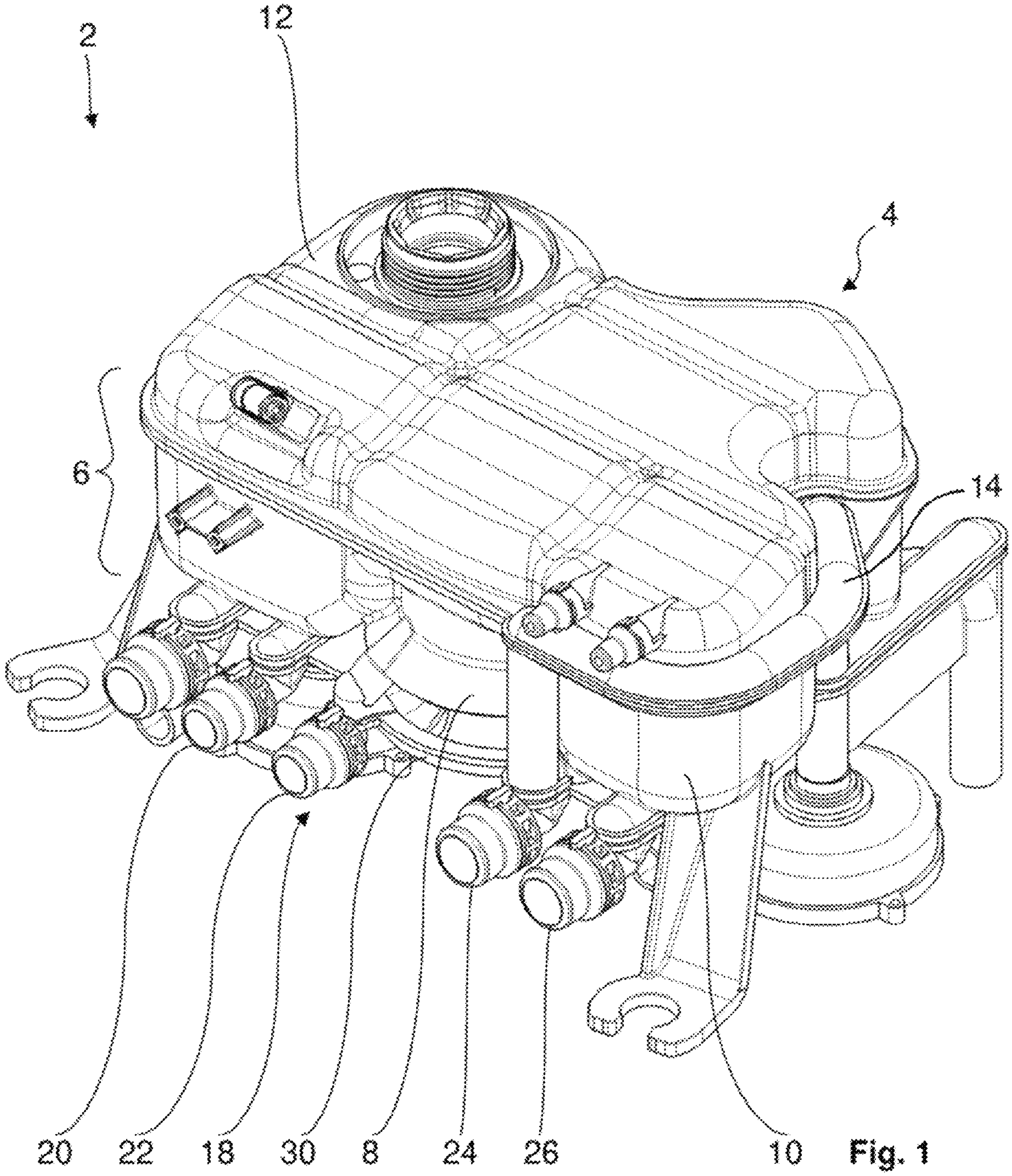
FIG. 1 is an example of the vehicle according to the invention with the liquid system according to the invention in a first partial, perspective representation.
Figure 2:
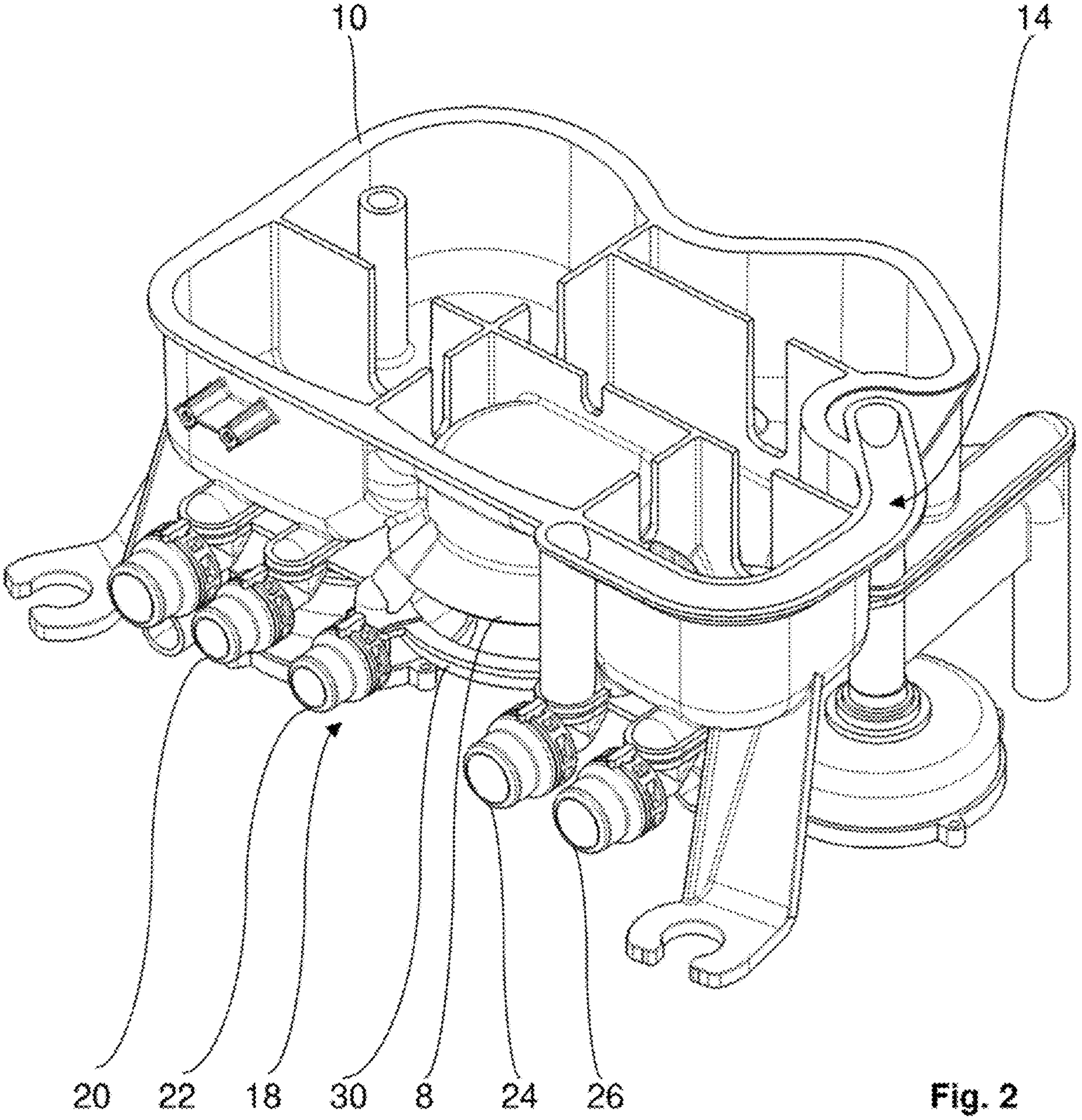
FIG. 2 is the example in a second partial, perspective representation, without the topmost tank housing shell.
Figure 3:
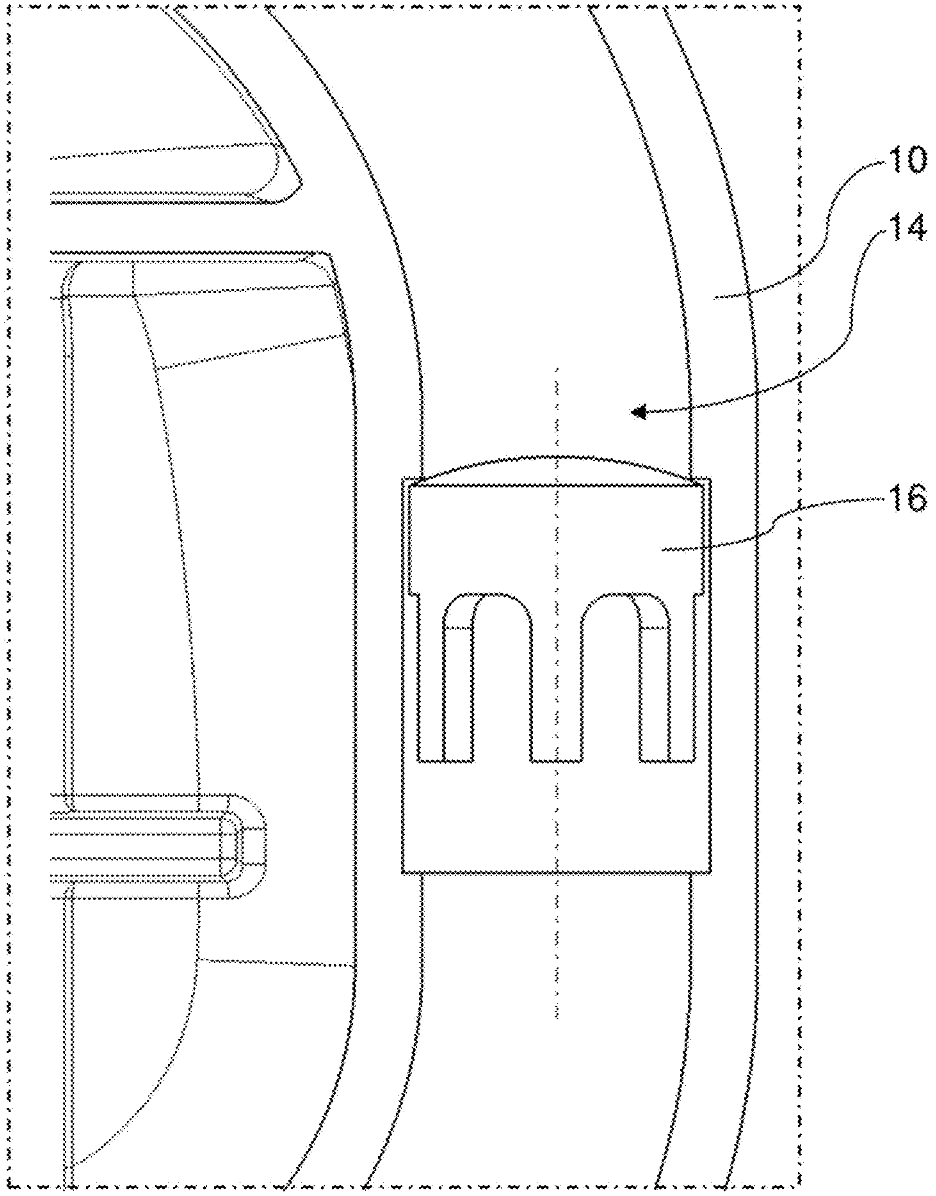
FIG. 3 is the example in a detail view in the region of the first valve, in a partial, sectional top view.

An example of a vehicle according to the invention, with a liquid system according to the invention, is shown by way of example in FIGS. 1 to 3.

The vehicle is designed here as a motor vehicle, for example, an all-electric vehicle, and is not shown in detail.

The liquid system 2 for the vehicle is designed as a coolant system for cooling the traction battery and the drive motor along with the corresponding power electronics, as well as for cooling a refrigerant circuit for air conditioning a passenger compartment of the vehicle. The traction battery, the drive motor with the corresponding power electronics, the refrigerant circuit, and the passenger compartment of the vehicle are designed, for example, in a manner known per se to the person skilled in the art.

The liquid system 2 designed as a coolant system includes a liquid tank 4 designed as a coolant tank for storage of a liquid of the vehicle, which liquid is implemented as a coolant, and a total of three liquid circuits connected in a flow-conducting manner to the liquid tank 4 and designed as coolant circuits in which the liquid circulates. The liquid circuits are not shown in detail in FIGS. 1 to 3, and are designed in a manner known per se to the person skilled in the art.

The liquid tank 4 of the liquid system 2 includes a tank housing 6 for storage of the liquid of the liquid system 2, wherein the tank housing 6 is designed as multiple shells and has at least two tank housing shells that are joined to one another, namely a bottommost tank housing shell 8, a middle tank housing shell 10, and a topmost tank housing shell 12, and at least one flow passage of the liquid system 2, which flow passage is integrated in the tank housing 6. In the present exemplary embodiment, one of the flow passages integrated in the tank housing 6, namely the flow passage 14, is formed by two joined tank housing shells, namely the middle and topmost housing shells 10, 12 of the at least two tank housing shells 8, 10, 12. See FIG. 2 in this regard. The tank housing shells 8, 10, 12 are each designed as an injection molded plastic part here.

Arranged in the flow passage 14 is a first valve 16 designed as a check valve. See FIG. 3 in this regard.

Figure 4:
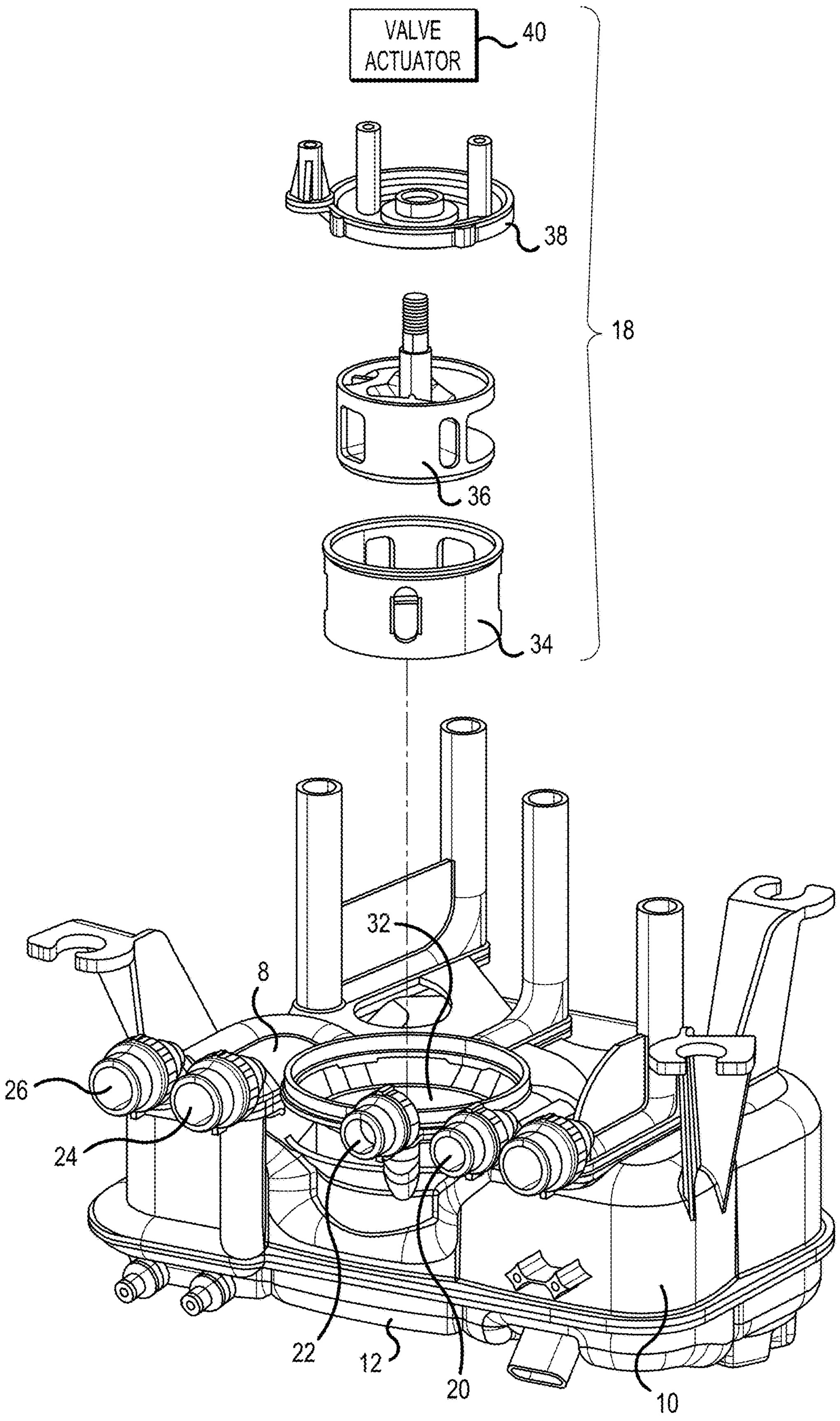
FIG. 4 is the example of the first partial, perspective representation of FIG. 1, when viewed from the bottom with an exploded view of the second valve.

The liquid system 2 additionally has a second valve 18 for controlling at least one liquid flow of the liquid in the liquid system 2, which valve is connected in a flow-conducting manner to the liquid circuits and/or to the liquid tank 4, wherein the tank housing 6, namely the bottommost tank housing shell 8, is simultaneously designed as a valve housing 32 for the second valve 18 of the liquid system 2. See FIGS. 1, 2 and 4 in this regard.

The second valve 18 is designed here as a so-called multiway valve, and includes the valve housing 32 simultaneously designed as bottommost tank housing shell 8 with a multiplicity of valve housing openings, a valve body 36 that is arranged in the valve housing 32 so as to be rotatable about a rotational axis and has at least one flow-conducting connecting passage for the flow-conducting connection of at least two valve housing openings of the multiplicity of valve housing openings, a valve seal 34 that is arranged between the valve housing 32 and the valve body 36 and has valve seal openings corresponding to the valve housing openings, a valve actuator 40 for automatically rotating the valve body 36 about the rotational axis, and a multiplicity of a total of five flow passages corresponding to the valve housing openings for the flow-conducting connection of the second valve 18, namely of the valve housing openings, to a remainder of the liquid system 2. Only four of the total of five flow passages, namely the flow passages 20, 22, 24, 26, are visible in FIGS. 1 and 2.

The valve housing openings of the valve housing 32 of the second valve 18 are not shown in FIGS. 1 to 3. The same is true of the valve body 36 with the at least one connecting passage, the valve seal 34 with the valve seal openings designed to correspond to the valve housing openings, and the valve actuator 40 (see FIG. 4 in this regard).

The flow passages 20, 22, 24, 26 that are connected in a flow-conducting manner to the second valve 18 are formed jointly from a single first passage shell and from a single second passage shell 30, wherein the first passage shell is simultaneously formed as the valve housing 32, namely the bottommost tank housing shell 8, which can be joined to the second passage shell 30 to form the aforementioned flow passages 20, 22, 24, 26. Analogously to the bottommost tank housing shell 8 that is simultaneously designed as first passage shell and valve housing 32, in the present exemplary embodiment the second passage shell 30 is likewise designed as an injection molded plastic part. The two passage shells 8, 22 are joined to one another by plastic welding for the purpose of forming the aforementioned flow passages 20, 22, 24, 26. Other joining methods are also absolutely possible, however. The person skilled in the art will choose the joining method suitable for joining the two passage shells according to the requirements of the individual case. Strictly by way of example, mention is made here only of adhesive bonding methods.

In the present exemplary embodiment, the bottommost tank housing shell 8 that is simultaneously designed as valve housing 32 and as first passage shell is designed to be moldable in such a manner that a seal side of the bottommost tank housing shell 8 that faces the valve seal 34 is designed to be essentially flash-free after a demolding of the bottommost tank housing shell 8. In manufacturing terms, this is implemented here in that, for example, mold separation at the seal side of the bottommost tank housing shell 8 is avoided by design with the aforementioned injection molded plastic part, namely the bottommost tank housing shell 8.

The vehicle according to the invention with the liquid system according to the invention in accordance with the present exemplary embodiment is explained below in detail on the basis of FIGS. 1 to 3.

First of all, the individual tank housing shells, namely the bottommost tank housing shell 8 simultaneously designed as first passage shell and valve housing 32, the middle tank housing shell 10, and the topmost tank housing shell 12 of the tank housing 6 of the liquid tank 4, as well as the second passage shell 30, are each produced individually as injection molded plastic parts, which is to say separately from one another, in a manner known to the person skilled in the art.

Next, the individual tank housing shells 8, 10, 12 are plastic welded to one another, resulting in the tank housing 6 of the liquid tank 4. See FIG. 1 in this regard.

The liquid tank 4 is only partially shown in FIG. 2, namely to the effect that only the bottommost and the middle tank housing shells 8, 10 of the total of three tank housing shells 8, 10, 12 of the tank housing 6 are shown, so the view of a bottom part of the flow passage 14 integrated in the middle tank housing shell 10 is unobstructed. This bottom part of the flow passage 14, as shown in FIG. 2, then forms the flow passage 14 after the joining of the middle tank housing shell 10 to the topmost tank housing shell 12, in which an upper part of the flow passage 14, corresponding to the aforementioned bottom part of the flow passage 14, is formed, as shown in FIG. 1.

For the purpose of forming the flow passages 20, 22, 24, 26 that are connected in a flow-conducting manner to the second valve 18, the second passage shell 30 is now plastic welded to the bottommost tank housing shell 8 that is simultaneously designed as first passage shell and valve housing 32. Analogously to the design of the flow passage 14, a part of each of the flow passages 20, 22, 24, 26 is formed in the bottommost tank housing shell 8 and a relevant corresponding part of each of the flow passages 20, 22, 24, 26 is formed in the second passage shell 30. The flow passages 20, 22, 24, 26 are produced accordingly, as can be seen from FIGS. 1 and 2.

Finally, the second valve 18 is now completed by the means that first the valve seal 34 and then the valve body 36 of the second valve 18 are inserted and secured, in a manner known per se to the person skilled in the art, in the bottommost tank housing shell 8 that is designed as valve housing 32. For this purpose, the second valve 18 has, for example, an end plate 38, which seals the second valve 18 at the bottom in the respective image plane in FIGS. 1 and 2 (and as shown in the bottom view of FIG. 4). In the present exemplary embodiment, this end plate 38 is mechanically joined to the tank housing shell 8 that is simultaneously designed as valve housing 38 by means of three screws.

On account of the design according to the invention of the liquid tank for a liquid system of a vehicle, of the liquid system for a vehicle, and of the vehicle according to the present exemplary embodiment, it is possible to implement the aforementioned liquid tank 4, the aforementioned liquid system 2, and the aforementioned vehicle in a manner that is especially simple in terms of design and manufacturing. Furthermore, a centralization of the components of the liquid system 2 for the vehicle is made possible as a result. At the same time, a flow-optimized shape of the flow passages 14, 20, 22, 24, 26 of the liquid system 2 can be implemented easily in terms of manufacturing in this case, since, on the one hand, the flow passage 14 of the liquid system formed by the joined middle and topmost tank housing shells 10, 12 is not only integrated in the tank housing 6, but can be freely configured within broad suitable limits on account of the aforementioned design. Similar applies to the integration of the valve housing 32 of the second valve 18 in the tank housing 6 and the flow passages 20, 22, 24, 26 connected in a flow-conducting manner to the second valve 18, which flow passages are likewise integrated in the tank housing by means of the bottommost tank housing shell 8 that is simultaneously designed as first passage shell.

The invention is not limited to the present exemplary embodiment. For example, the invention can also be used to good advantage with other types of vehicles. This applies not only to land vehicles, but also to aircraft and watercraft.

In particular, the invention is not restricted to the design and manufacturing details of the exemplary embodiment. For example, the number of the at least one flow passage(s) formed by two joined tank housing shells of the at least two tank housing shells can be freely chosen within broad suitable and technically feasible limits. Similar applies to the number of flow passages connected in a flow-conducting manner to the second valve and the number of corresponding valve housing openings and valve seal openings. The same applies to the spatial arrangement of the individual flow passages, which likewise can be freely chosen, within the technical constraints, as a function of the spatial conditions of the use case in question.

It is also possible that the tank housing is formed only of two tank housing shells. However, any other practical number of tank housing shells is also possible in principle.

In contrast to the present exemplary embodiment, the second valve can also be attached by means of its valve housing merely to the liquid tank, namely the tank housing. Accordingly, an integration of the valve housing of the second valve in the tank housing is not absolutely imperative. Furthermore, the second valve can also be attached to other suitable components of the vehicle, for example a vehicle body or a drive motor of the vehicle. However, other embodiments of the invention are also possible in which no second valve is present.

Instead of the design of the individual tank housing shells as injection molded plastic parts, other manufacturing methods and materials known to the person skilled in the art can be used for the tank housing shells. Accordingly, tank housing shells designed as plastic parts can also be manufactured in other suitable ways. However, other materials as distinguished from plastic that are suitable for the liquid tank in question, such as, e.g., aluminum, can also be used for manufacturing the individual tank housing shells. The particular joining method for joining the individual tank housing shells is then matched to the materials used. Of course, combinations of materials and/or manufacturing methods and/or joining methods are also absolutely possible for manufacturing the tank housing shells as well as the liquid tank, however.

Of course, it is not only in liquid systems designed as coolant systems of a vehicle that the invention can be employed to good advantage. Accordingly, the invention can be employed for a multiplicity of quite different use cases.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A liquid tank for a liquid system of a vehicle, the liquid tank comprising:

a tank housing for storage of a liquid of the liquid system, the tank housing being formed of at least three tank housing shells that are joined to one another, the at least three tank housing shells including a bottommost tank housing shell, a middle tank housing shell and a topmost tank housing shell; and at least one flow passage integrated in the tank housing, the at least one flow passage being formed by the middle tank housing shell and the topmost tank housing shell that are joined together, wherein portions of each of the bottommost tank housing shell, the middle tank housing shell and the topmost tank housing shell form exterior surfaces of the tank housing, and wherein each of the at least three tank housing shells are designed as an injection molded plastic part.

2. The liquid tank according to claim 1, wherein a first valve is arranged in the at least one flow passage formed by the middle tank housing shell and the topmost tank housing shell that are joined together.

3. The liquid tank according to claim 2, wherein the first valve is a check valve.

4. The liquid tank according to claim 1, wherein the tank housing includes a valve housing for accommodating at least one second valve of the liquid system.

5. The liquid tank according to claim 4, wherein the bottommost tank housing shell of the tank housing forms the valve housing for the at least one second valve.

6. A liquid system of a vehicle, the liquid system comprising:

the liquid tank according to claim 1 for storage of a liquid of the liquid system; and at least one liquid circuit that is connected in a flow-conducting manner to the liquid tank and has the at least one flow passage in which the liquid circulates through the liquid tank.

7. The liquid system according to claim 6, wherein the liquid system has at least one second valve for controlling at least one liquid flow of the liquid in the liquid system, the at least one second valve being connected in a flow-conducting manner to the at least one liquid circuit and/or to the liquid tank, and wherein the tank housing includes a valve housing for the at least one second valve of the liquid system.

8. The liquid system according to claim 7, wherein the bottommost tank housing shell of the tank housing forms the valve housing for the at least one second valve.

9. A vehicle comprising the liquid system according to claim 6, wherein the liquid system is a coolant system of the vehicle.

10. The liquid tank according to claim 1, wherein the middle tank housing shell is provided with a bottom part of the at least one flow passage and the topmost tank housing shell is provided with an upper part of the at least one flow passage, and wherein when the middle tank housing shell is joined to the topmost tank housing shell, the bottom part is joined to the upper part to form the at least one flow passage therebetween.

11. A liquid tank for a liquid system of a vehicle, the liquid tank comprising:

a tank housing for storage of a liquid of the liquid system, the tank housing being formed of at least three tank housing shells that are joined to one another, the at least three tank housing shells including a bottommost tank housing shell, a middle tank housing shell and a topmost tank housing shell;

at least one flow passage integrated in the tank housing, the at least one flow passage being formed by the middle tank housing shell and the topmost tank housing shell that are joined together; and a passage shell, wherein portions of each of the bottommost tank housing shell, the middle tank housing shell and the topmost tank housing shell form exterior surfaces of the tank housing, wherein the tank housing includes a valve housing for accommodating at least one second valve of the liquid system, wherein the bottommost tank housing shell of the tank housing forms the valve housing for the at least one second valve, and wherein the passage shell is joined to the bottommost tank housing shell, wherein the passage shell, together with the bottommost tank housing shell, form additional flow passages when joined together.

12. The liquid tank according to claim 11, wherein the passage shell is joined to the bottommost tank housing shell, such that the bottommost tank housing shell is disposed between the passage shell and the middle tank housing shell.

* * * * *